INVENTOR.
MARTINUS HOLL
BY
Frank R. Jinfari
AGENT

March 10, 1970 M. HOLL 3,499,652

RECORD PLAYER

Filed Sept. 15, 1967 3 Sheets-Sheet 2

INVENTOR.
MARTINUS HOLL
BY
Frank R. Jifari
AGENT

March 10, 1970 M. HOLL 3,499,652

RECORD PLAYER

Filed Sept. 15, 1967 3 Sheets-Sheet 3

INVENTOR.
MARTINUS HOLL
BY
Frank R. [signature]
AGENT

United States Patent Office 3,499,652
Patented Mar. 10, 1970

3,499,652

RECORD PLAYER

Martinus Holl, Flers, Orne, France, assignor, by mesne assignments, to U.S. Philips Corporation, New York, N.Y., a corporation of Delaware Filed Sept. 15, 1967, Ser. No. 667,913
Claims priority, application France, Sept. 22, 1966, 77,296
Int. Cl. G11b *25/04*
U.S. Cl. 274—9 3 Claims

ABSTRACT OF THE DISCLOSURE

A record player having a rotating control disc and mechanical linkage arrangement connected thereto for moving a tone arm and feeler device away from the turntable after the gauging of the diameter of a record placed thereon. The control disc is also provided with a cam track and associated means for delaying the rotational movement of the turntable until after the tone arm and feeler device has moved away.

The invention relates to a record player which includes a turn-table, an electric motor, a tone arm arranged to pivot horizontally and vertically about a vertical spindle, and a control disc which is driven by the said electric motor and serves to control certain horizontal and vertical movements of the tone arm, the other horizontal movements depending upon the diameter of the record to be played. This diameter is gauged by a feeler device which forms part of the tone arm.

In the known record players of the aforesaid type the turn-table is started at the same time as the motor; hence the record is rotating when the feeler device comes into contact with it, and this gives rise to a disagreeable noise which is amplified by the loudspeaker.

It is an object of the present invention to eliminate this disadvantage. A record player according to the invention is characterized by the provision of means which ensure that the turn-table starts rotating only after the diameter of the record has been determined and the feeler device is no longer in contact with the record.

In a suitable embodiment of the record player according to the invention the said means are comprised of a cam pin which is held in contact with a cam track provided along the periphery of the control disc and the pin is secured to a rod, the horizontal movements of which bring about the displacement of an idler wheel which transmits the rotation movement of the motor to the turn-table.

In order to simplify the mechanism and to ensure that irrespective of the diameter of the record the turn-table starts rotating only when the feeler device no longer is in contact with the record, in a preferred embodiment of the record player according to the invention the turntable will start rotating only after the control disc has been rotated from its inoperative position through an angle of about 150°, the feeler device being caused to move away from the record by the central disc when said control disc has rotated through an angle of 100°.

The term "inoperative position" is used herein to mean the position occupied by the control disc when the tone arm has returned to its support after the playing of a record.

Figure 1:
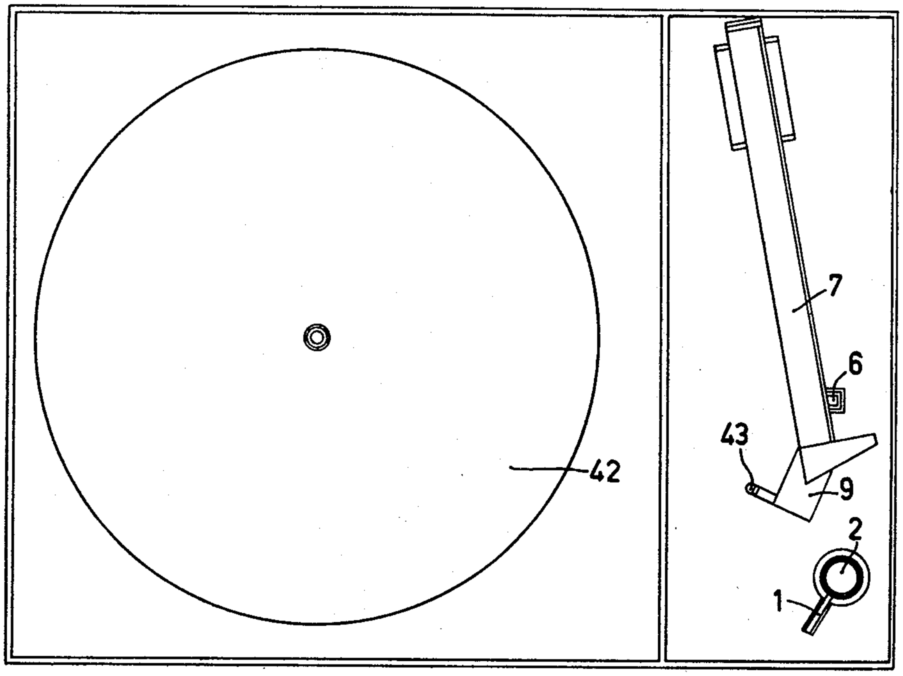
Figure 2:
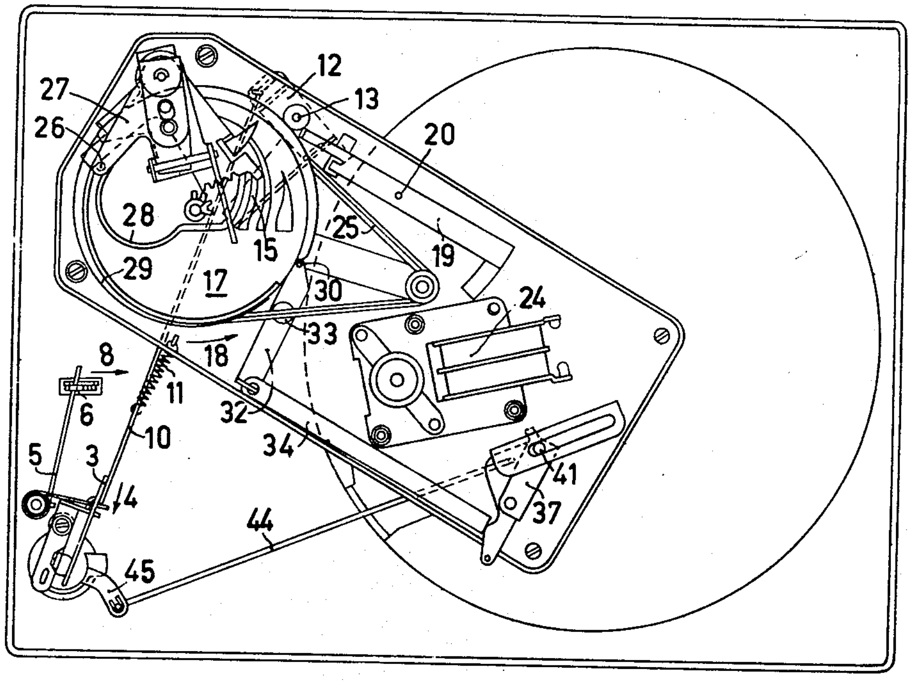
Figure 3:
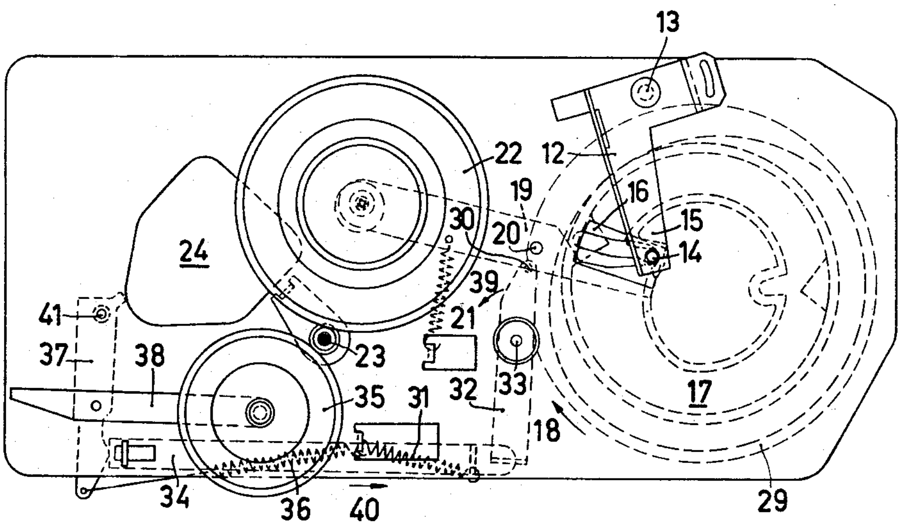

In order that the invention may readily be carried out, an embodiment thereof will now be described with reference to the accompanying diagrammatic drawings in which FIGURE 1 is a top plan view of a record player according to the invention, FIGURE 2 is a bottom plan view of the driving mechanism of the turn-table and the tone arm, FIGURE 3 is a top plan view of this mechanism.

The figures show only those components which are essential to an understanding of the invention.

When a user wants to play a record, he only has to set a switch 1 in accordance with the record speed to the position 78, 45, 33 or 16 revolutions per minute and to depress a push-button 2 (FIGURE 1) after which the following cycle of operations is automatically effected.

Pushing the button 2 causes not only the motor to start but also a member 3 to be displaced in the direction indicated by the arrow 4 (FIGURE 2). A lever 5 causes a hook 6 which maintains a tone arm 7 in the inoperative position to move in the direction indicated by the arrow 8, so that the tone arm 7 is released and is raised by a spring (not shown).

At the same time the movement of the member 3 causes a rod 10 to be displaced with the result that a spring 11 is stretched and a lever 12 is pivoted about a spindle 13. A pin 14 at one end 15 of the lever 12 is pressed against a cam 16 on a control disc 17 and causes it to rotate in the direction indicated by the arrow 18. The displacement of the pin 14 (FIGURE 3) also results in a lever 19 being pivoted about a spindle 20 under the action of a spring 21. Owing to the pivotal movement of the lever 19 a wheel 22 is pressed against a driving pulley 23 of a motor 24. The wheel 22 then drives the control disc 17 by means of a belt 25 (FIGURE 2). Mechanical linkage connecting the tone arm to the control disc has a pin 26, secured to a member 27, which member is integral with the tone arm 7. The rotation of the control disc 17 produces a horizontal movement of the tone arm 7 away from the turntable through cams 28, the vertical movements of the arm 7 are produced by another pin which is not shown in the figures and is displaced by means of cams arranged on the control disc face shown in FIGURE 3.

As the horizontal and vertical movements of the tone arm 7 and feeler device 43 towards a record placed on the turntable 42 for the purpose of gauging the diameter of said record are known, they will not be described in greater detail.

According to the invention the control disc 17 is provided at its circumference with a cam track 29 against which a cam pin 30 is pressed by a spring 31. The cam pin 30 is secured to a rod 32 arranged to pivot about a spindle 33. The rod 32 is rigidly connected to a lever 34. In the inoperative position (FIGURE 3) this lever keeps an idler wheel 35 spaced from the pulley 23 by means of members 37 and 38 against the action of a spring 36.

When the control disc 17 starts rotating the track 29 gradually pushes back the cam pin 30 which causes the rod 32 to pivot in the direction indicated by the arrow 39 and the lever 34 to move in the direction indicated by the arrow 40. Under the action of the spring 36 the member 37 starts to pivot about a spindle 41 until the wheel 35 comes into contact with the pulley 23 and the inner edge of a turntable 42 (not shown in FIGURE 3). The idler wheel 35 then transmits the rotation movement of the driving pulley 23 to the turntable 42.

The control disc is adjusted and shaped so as to allow rotation of the turntable only after the feeler device 43 on the tone arm 7 is free of contact with the record. If the feeler device cannot come into contact with records of diameters smaller than that of the turntable 42 then the turntable 42 starts rotating after the same time delay relative to the tone arm as for the other record diameters.

In known manner the pulley 23 has four portions of different diameters for various turntable rotational speeds; positioning of the idler wheel 35 relative to one of these portions is produced by means of a rod 44 which is rigidly connected to a member 45 and forms part of the switch 1.

What is claimed is:

1. A record player comprising a turntable, a pivotable tone arm mounted for movement towards and away from said turntable and having a feeler device affixed thereto for contacting and gauging the diameter of a record placed on the turntable, a motor, a control disc, means for operatively connecting the motor to the control disc to cause rotation of the control disc, linkage means connecting the tone arm and feeler device to the control disc for moving the tone arm and feeler device away from the turntable in response to the rotational movement of the control disc after said contacting and gauging by said feeler device, a cam track in the control disc and means associated with the cam track which will upon further rotational movement of the control disc operatively engage the motor with the turntable to rotate the turntable, said engagement being subsequent to the movement of the tone arm and feeler device away from the turntable and the tone arm thereafter engaging the record on the rotating turntable.

2. A record player as claimed in claim 1 wherein the cam track includes a circumferential track in the control disc, and the means associated with the cam track comprises a pivotally mounted rod having a cam pin engaging the track, a lever attached to the rod and a displaceable idler wheel movable by the lever for transmitting rotational movement from the motor to the turntable.

3. A record player as claimed in claim 2 wherein the turntable starts rotating after the control disc has been rotated through an angle of about 150°.

References Cited

UNITED STATES PATENTS

| | | | |
|---|---|---|---|
| 3,379,442 | 4/1968 | Tatter et al. | 274—10 |
| 3,243,188 | 3/1966 | Caddy et al. | 274—10 |
| 3,168,317 | 2/1965 | Hansen | 274—10 |
| 3,141,676 | 7/1964 | Zarm | 274—9 |
| 2,818,263 | 12/1957 | Dale | 274—10 |

LEONARD FORMAN, Primary Examiner

R. A. FIELDS, Assistant Examiner

U.S. Cl. X.R.

274—15